United States Patent
Kempel et al.

(10) Patent No.: US 11,653,192 B2
(45) Date of Patent: May 16, 2023

(54) SYSTEMS AND METHODS FOR GENERATING EMERGENCY RESPONSE

(71) Applicant: TG-17, LLC, Boston, MA (US)

(72) Inventors: Doron Kempel, New York, NY (US); Rich Lobovsky, New York, NY (US); Jose Malpartida, New York, NY (US); Elad Moshe, Tel Aviv (IL)

(73) Assignee: TG-17, LLC, Boston, MA (US)

( * ) Notice: Subject to any disclaimer, the term of this patent is extended or adjusted under 35 U.S.C. 154(b) by 71 days.

(21) Appl. No.: 17/512,952

(22) Filed: Oct. 28, 2021

(65) Prior Publication Data

US 2022/0132290 A1    Apr. 28, 2022

Related U.S. Application Data

(60) Provisional application No. 63/106,428, filed on Oct. 28, 2020.

(51) Int. Cl.
*H04W 4/90* (2018.01)
*H04W 4/029* (2018.01)
*H04L 67/306* (2022.01)

(52) U.S. Cl.
CPC ............ *H04W 4/90* (2018.02); *H04L 67/306* (2013.01); *H04W 4/029* (2018.02)

(58) Field of Classification Search
CPC ........ H04W 4/90; H04W 4/029; H04L 67/306
USPC ...................................................... 455/404.1
See application file for complete search history.

(56) References Cited

U.S. PATENT DOCUMENTS

| | | | |
|---|---|---|---|
| 2017/0161614 A1* | 6/2017 | Mehta | G06N 20/00 |
| 2020/0135005 A1 | 4/2020 | Katz et al. | |
| 2020/0288295 A1 | 9/2020 | Martin et al. | |

FOREIGN PATENT DOCUMENTS

| | | | |
|---|---|---|---|
| CN | 107358562 | * 11/2017 | G06Q 50/06 |

OTHER PUBLICATIONS

CN 107358562 English Translation (Jul. 18, 2017) (Year: 2017).*
International Search Report and Written Opinion in related international application No. PCT/US2021/056973 dated Feb. 32, 2022.

* cited by examiner

*Primary Examiner* — Ted M Wang
(74) *Attorney, Agent, or Firm* — Polsinelli, P.C.

(57) ABSTRACT

Disclosed are systems and methods for dynamically providing emergency and preventative information topics. A preventative information policy is received for a set of users and comprises selected preventative information topics and user parameters associated with the set of users. A user profile is generated from the preventative information policy. One or more dynamically determined emergency guideline topics are calculated for a given user by analyzing a current user location against a database of emergency event entries, each entry including a classification and a location of an ongoing emergency event. A set of proximity-adjusted emergency events is determined for the current user location and one or more calculated relevance levels are applied, based at least in part on the preventative information policy. A selectable user interface element is generated for each dynamically determined emergency guideline topic and selected preventative information topic, wherein the selectable user interface elements indicate the calculated relevance levels.

20 Claims, 7 Drawing Sheets

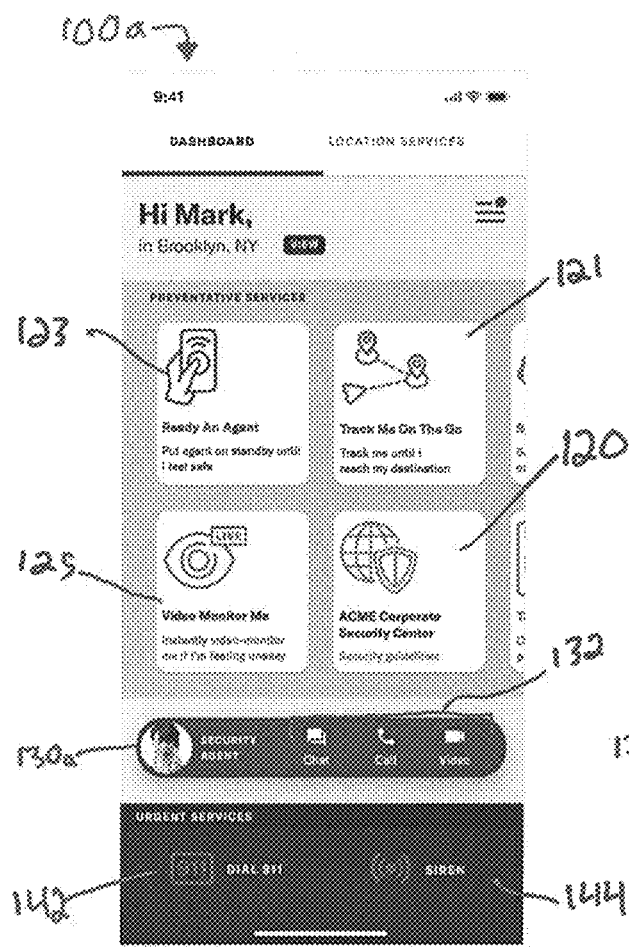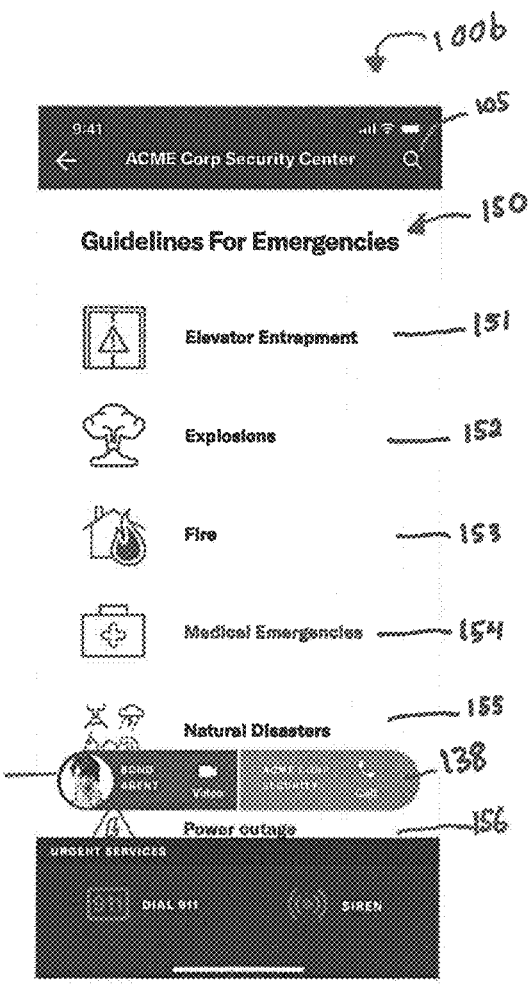
FIG. 1A                    FIG. 1B

SYSTEMS AND METHODS FOR GENERATING EMERGENCY RESPONSE

CROSS-REFERENCE TO RELATED APPLICATIONS

This application claims the benefit of priority to U.S. Provisional Application No. 63/106,428 filed Oct. 28, 2020 and entitled "SYSTEMS AND METHODS FOR GENERATING EMERGENCY RESPONSE," the disclosure of which is herein incorporated by reference in its entirety.

TECHNICAL FIELD

The present disclosure pertains to emergency and preventative services, and more specifically to a system and method for automatically providing emergency and preventative services and resources.

BACKGROUND

Emergency guidelines and preventative information have become increasingly important in both personal and business-related contexts, particularly as awareness continues to increase of the various risks posed by multiple different types of emergency events. Additionally, many corporations and other employers often implement their own emergency guidelines, which may seek to protect both the safety of employees as well as the safety of the business, a combination that can sometimes lead to confusing, unexpected, or unknown requirements and/or recommendations for action when certain events occur. Moreover, corporate guidelines, policies, and procedures (both emergency and non-emergency) are often difficult to access, located for example behind access-restricted systems that require users to login and often navigate a series of menu options before viewing. Impediments and other frictions to access can reduce compliance with guidelines and policies, in the event that they are even viewed at all. The fragmented nature in which different guidelines are made available further compounds the problem, particularly when considering that many users desire guidelines and preventative information that covers all aspects of their lives, both working and personal. Further still, many emergency guidelines and preventative information sources are, by their nature, overly broad as they are meant to be applicable to the largest audience possible. However, individuals lead increasingly personalized lives, and so too have many emergency events become increasingly localized, and therefore, personalized as well. Accordingly, it would be desirable to provide systems and methods capable of automatically providing a centralized source of emergency and preventative information that is dynamically determined as being relevant to individual users.

BRIEF SUMMARY

In some examples, disclosed are systems and methods for automatically providing emergency and preventative services and information. In some embodiments, the method comprises receiving, for a given user of a first set of users, a first preventative information policy, wherein the first preventative information policy comprises one or more selected preventative information topics and one or more user parameters associated with the first set of users; generating, based at least in part on the first preventative information policy, a user profile, wherein the user profile includes the one or more selected preventative information topics; calculating, for the given user, one or more dynamically determined emergency guideline topics by: analyzing a current user location against a database of emergency event entries, each emergency event entry including at least a classification of an ongoing emergency event and a location of the ongoing emergency event; based at least in part on the analysis, determining a set of proximity-adjusted emergency events for the current user location; and generating the one or more dynamically determined emergency guideline topics by applying one or more calculated relevance levels to the set of proximity-adjusted emergency events, the one or more calculated relevance levels based at least in part on the first preventative information policy; and generating a selectable user interface element for each of the one or more dynamically determined emergency guideline topics and the one or more selected preventative information topics, wherein the selectable user interface elements generated for the dynamically determined emergency guideline topics indicate the calculated relevance levels.

In some embodiments, generating the selectable user interface element for a given one of the dynamically determined emergency guideline topics further comprises linking the selectable user interface element to a textual content for the given one of the dynamically determined emergency guideline topics.

In some embodiments, generating the selectable user interface element for a given one of the selected preventative information topics further comprises linking the selectable user interface element to a textual content file location determined from the first preventative information policy.

In some embodiments, the one or more selected preventative information topics are selected from a plurality of pre-defined preventative information topics based at least in part on the one or more user parameters.

In some embodiments, the one or more user parameters include access permissions for the first set of users.

In some embodiments, the method further comprises calculating an update to the dynamically determined emergency guideline topics in response to detecting a change in the current user location, wherein detecting the change in the current user location is based on analyzing the current user location against one or more stored user location entries.

In some embodiments, the one or more calculated relevance levels are determined based at least in part on a user classification obtained from the one or more user parameters of the first preventative information policy.

In some embodiments, the method further comprises linking the selectable user interface element for the dynamically determined emergency guideline topic to an automatically generated audio content, wherein the automatically generated audio content is based on the textual content.

In some embodiments, the selectable user interface element for the dynamically determined emergency guideline topic is generated to include a selectable option between the textual content and an audio content, wherein the audio content is based on the textual content.

In some embodiments, the selectable user interface element for the dynamically determined emergency guideline topic is generated to include a selectable option between the textual content and a video content, wherein the video content is based at least in part on the textual content.

In some embodiments, the selectable user interface element for the dynamically determined emergency guideline topic is generated to include a selectable option between the textual content, and one or more of an audio content and a video content, wherein the audio content is based on the textual content and wherein the video content is based at least in part on one or more of the audio content and the textual content.

In some embodiments, the method further comprises receiving a second preventative information policy for a second set of users, wherein: the second preventative information policy includes one or more selected preventative information topics and one or more user parameters different from those of the first preventative information policy; and one or more dynamically determined emergency guideline topics generated for the second set of users based on the second preventative information policy are different from the one or more dynamically determined emergency guideline topics generated for the given user of the first set of users.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1A depicts an example user interface of a mobile application according to one or more aspects of the present disclosure;

FIG. 1B depicts an example user interface presenting dynamic emergency guidelines and resources, according to one or more aspects of the present disclosure;

DETAILED DESCRIPTION

Figures 2A, 2B:
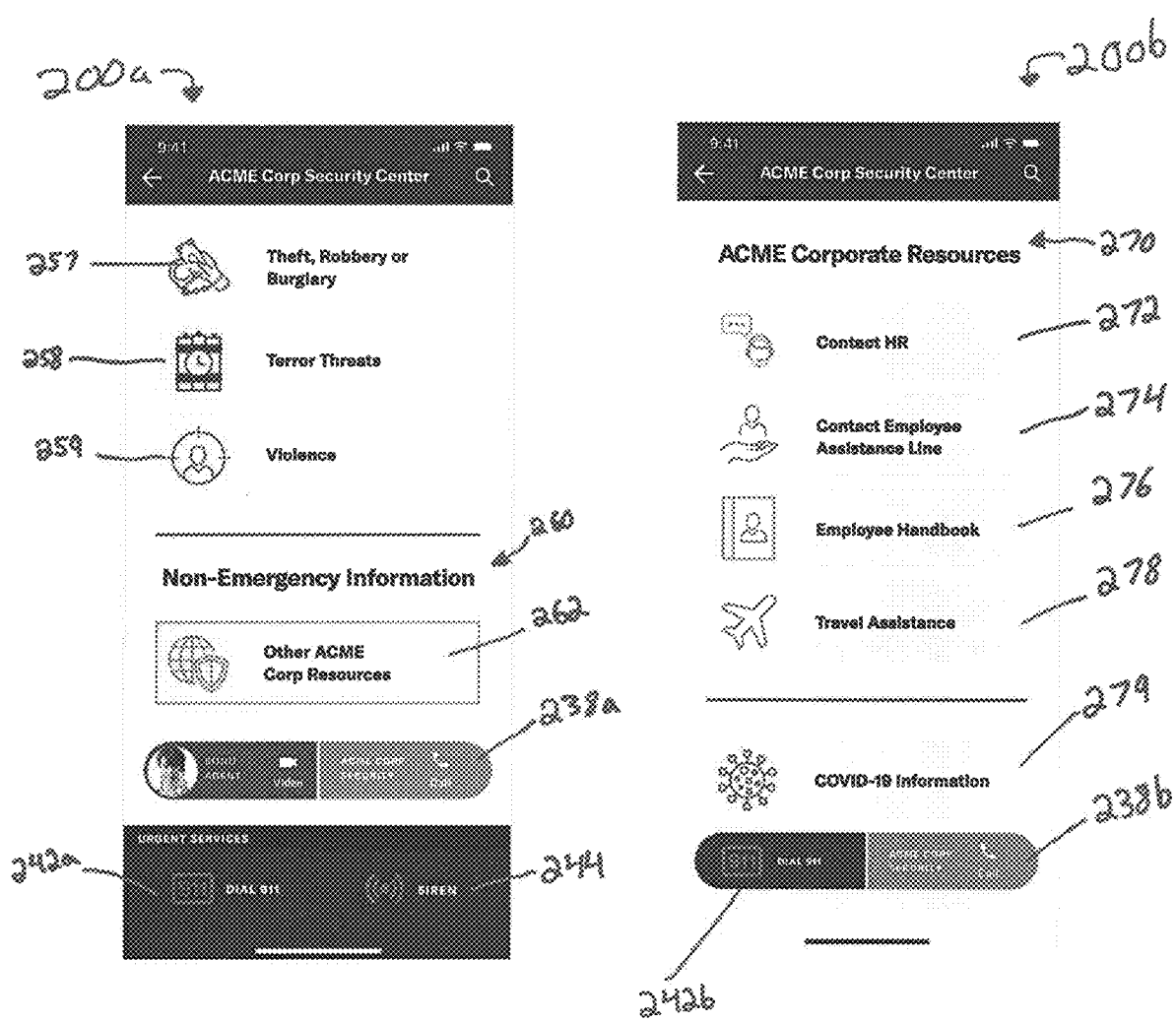
FIG. 2A depicts an example user interface presenting dynamic emergency guidelines and resources in combination with non-emergency information and resources, according to one or more aspects of the present disclosure.
FIG. 2B depicts an example user interface presenting non-emergency information and resources, according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Disclosed are systems and methods for automatically providing emergency and/or preventative information and resources to one or more users. For example, the system can provide preventative information and security guidelines for a selected one of a plurality of different potential emergency events, such as an elevator entrapment, an explosion, a fire, a power outage, a natural disaster, etc. In some embodiments, the preventative information and security guidelines can be personalized or otherwise customized for a given user, based on factors such as the user's employer, geographic location, demographic information, or other profile information, as will be discussed in greater depth below. Notably, in this manner, a particular user can be provided with dynamic information that is most directly relevant not only to a selected emergency event (and/or a predicted/potential emergency event) in a general sense, but also directly relevant to that particular user's experience of the emergency event.

As will be discussed in greater depth below, the resources provided or otherwise made available to a user can include but are not limited to one or more of: a physical response (e.g., provided by public, private, and/or corporate emergency response services); a communication session; a tracking or monitoring session; emergency information and/or guidelines (both dynamically presented and pre-determined); non-emergency information and/or guidelines (both dynamically presented and pre-determined); preventative information; security guidelines, etc.

In some embodiments, one or more of the presently disclosed systems and methods can be provided or implemented via a mobile application running on a user's smartphone or other mobile computing device. In some cases, some or all of the preventative information described herein can be provided to a user in an offline manner, i.e., without requiring the use of an internet or other communication network connection, and via various communication modalities. It is also contemplated that some or all of the preventative information described herein can be provided to a user in an on-demand or substantially real-time manner via one or more communication networks, e.g., delivered from one or more servers in a push or pull fashion. In such scenarios, the servers could be remotely located relative to the user and/or an affiliated organization of user (e.g., the user's employer), locally located relative to the user and/or an affiliated organization of the user, or some combination of the two. Similarly, the preventative information can be provided to the user via a combination of the offline storage and real-time delivery that are described above. In some embodiments, where some or all of the preventative information is cached locally at the user's device, a wireless communication network can be used to deliver updated and/or additional preventative information, which can then be cached or otherwise stored locally as well.

In some embodiments, preventative information and security guidelines can be provided to a user in a text-based form, such as via a GUI (graphical user interface) of the aforementioned mobile application capable of running on a user's smartphone. The preventative information and security guidelines can also be provided in an audio-based form and/or a video-based form, either in standalone fashion or in combination with the text-based form. In some cases, audio and/or video representations of text-based content can be automatically generated, and moreover, can be automatically generated such that the audio or video representation is user controllable, automatically tagged with relevant portions, etc., as will be described in greater depth below. In some embodiments, a backend computing system can perform functionalities that include user and user account management, database services, emergency messaging and communication broadcast/dissemination, service usage tracking, etc.

The disclosure turns now to FIGS. 1A-B, which depict example user interface views of a mobile application implementing systems and methods of the present disclosure. In particular, FIG. 1A depicts an example home screen user interface 100a in which various preventative services are listed or otherwise made available for a user to request or interact with via the mobile application. As illustrated, the preventative services can include a 'Ready An Agent' interface element 123, a 'Track Me On The Go' interface element 121, a 'Video Monitor Me' interface element 125, and a 'Corporate Security Center' interface element 120, although it is appreciated that various other preventative services and interface elements can be utilized without departing from the scope of the present disclosure. In some cases, the user interface 100a can present a combination of tangible preventative services (e.g., corresponding to interface elements 121, 123, and 125) and informative security guidelines (e.g., corresponding to interface element 120). For example, tangible preventative services can cause one or more real-world actions to be taken or can otherwise be performed responsive to the user's real-world actions. Examples of informative security guidelines corresponding to the 'Corporate Security Center' interface element 120 are depicted in FIG. 1B, which will be discussed in greater depth below.

Also depicted in the example home screen user interface 100a of FIG. 1A is a security agent communication element 130a, which can include options 132 to initiate a text-based communication session ('Chat'), a voice-based communication session ('Call'), and a video-based communication session ('Video'). In some embodiments, the security agent communication element 130a can be a floating element that remains in a fixed position even as a user scrolls horizontally or vertically through the various preventative service elements that are also displayed in the example home screen user interface 100a. In some examples, security agent communication element 130a can be provided by the same underlying service as the 'Ready An Agent' user interface element 123. Additionally, or alternatively, it is further contemplated that user selection of the 'Ready An Agent' user interface element 123 can cause the example home screen user interface 100a to display or activate the security agent communication element 130a, which in some embodiments can be hidden or inactive until it is triggered in such a manner.

The example home screen user interface 100a can further include an urgent services interface element, shown here as including an emergency services contact element 142 (e.g., 'Dial 911') and a local emergency alert trigger element 144 (e.g., 'Siren'). Although the emergency services contact element 142 is depicted as initiating a 911 call, it is appreciated that the emergency services contact element 142 can be dynamically and automatically updated such that it is populated with both a display and underlying contact information for an appropriate local emergency service. For example, the mobile app can obtain a geolocation or GPS coordinate from the user's mobile phone or mobile computing device to determine the appropriate emergency service(s) to associate with the emergency services contact element 142, e.g., by cross-referencing the user's geolocation against a database of different emergency services available by location. Similarly, although the local emergency alert trigger element 144 is depicted here as causing a siren noise to be played, it is appreciated that various other local emergency alerts and indicators, both auditory and/or visual in nature, can be utilized without departing from the scope of the present disclosure.

FIG. 1B depicts an example user interface 100b that can be presented by the mobile application in response to a user selecting the user interface element 120 shown in FIG. 1A as 'ACME Corporate Security Center' (note that this name is used for illustrative and example purposes only—in the context of the present disclosure, security guidelines and preventative information could be provided in a generic format that is not customized for a particular organization, or could be provided with one or more customization requested or provided by a particular organization). Additionally, in some embodiments, the preventative information and security guidelines discussed herein can be integrated within or provided by a broader preventative services and emergency response system (see, for example, commonly owned U.S. Pat. No. 10,600,295, the contents of which are herein incorporated by reference in their entirety). In some embodiments, the preventative information and security guidelines can be provided in a standalone fashion, e.g., via a mobile application that presents the user interface of FIG. 1B as a default/home page.

As illustrated, the example user interface 100b presents a plurality of emergency guideline and preventative information topics 150, with individual ones of the topics depicted as topics 151-156 (although it is appreciated that a greater or lesser number of topics, different selections and arrangements of topics, etc., can be utilized without departing from the scope of the present disclosure). Regardless of whether the preventative information and security guidelines are presented as a part of a larger package of preventative services, or as a standalone service, it is contemplated that a plurality of different emergency situations, topics or categories can be initially presented for a user to make one or more selections. For example, the emergency guideline and preventative information topics can include, but are not limited to: elevator entrapment; explosions; fire; medical emergencies; natural disasters; power outages; suicide awareness; suspicious packages or persons; theft, robbery or burglary; terror threats; and violence. In some embodiments, the different emergency guideline and preventative information topics 150 can be dynamically selected and/or presented, e.g., based on factors such as user location, sensed data, predicted events, etc., as will be explained in greater depth below.

Note that as seen in FIG. 1B, the emergency guideline and preventative information topics 150 can be presented as either discrete topics corresponding to a specific emergency situation (e.g., 'Elevator Entrapment' 151), general categories or classifications (e.g., 'Medical Emergencies' 154 and 'Natural Disasters' 155), or some combination of the two. A more detailed example of an expandable or nested general category is seen in and discussed with respect to FIGS. 4A and 4B. With respect to the emergency guideline and preventative information topics 150, one or more (or each) of these topics can be provided by the user interface 100b as a clickable or interactable element, the selection of which causes the mobile application to present the user with more specific guidelines, information, educational resources, emergency contact information and emergency response resources, etc., that specifically correspond to the selected emergency guideline or preventative information topic (various examples of subsequent interface pages for selected emergency guideline/preventative information topics are discussed in greater depth below).

In some embodiments, a user can adjust one or more settings or preferences of the mobile application in order to customize or modify an order or arrangement in which the emergency situations and corresponding guidelines/preventative information topics 150 are displayed in the user interface 100b. For example, the user might manually reorganize the listing as desired or could be prompted to complete a questionnaire or setup wizard that takes user inputs and generates a dynamic/customized listing of emergency situations based on the user inputs (e.g., a user might indicate the emergency situations they are most likely to encounter, most unprepared for, most scared of, etc.). In some embodiments, the listing components and/or listing order might be determined by an organization to which the user belongs, such as the user's employer or company. A user's employer or company could additionally perform one or more of the listing order customization steps discussed above such that a customized corporate policy is pushed out to appropriate ones or subsets of the different users and user devices that the company has registered with the presently disclosed emergency guideline and preventative information system.

In some embodiments, emergency guideline and preventative information topics (e.g., such as the topics 150) can be presented dynamically. For example, a composition and/or ordered arrangement of the listing of topics might be subject to change based not only on user and company preferences as discussed above, but also based on dynamic determinations of relevancy, appropriateness, need, and other factors. In some cases, one or more dynamic determinations can be automatically made by the mobile application running on the user's phone or mobile computing device. In some cases, one or more dynamic determinations can be automatically made at a remote computing device or server.

Regardless of where the dynamic determinations are made, one or more customization triggers can be used to drive these dynamic determinations that cause the system to change the listing of topics. Other inputs and sensor data can be obtained, for example, from the user's mobile phone or computing device and subsequently used to drive the dynamic determination process to select particular ones of the available emergency guideline and preventative information topics that should be presented to a given user. The dynamic determination can be based on factors such as an identity of the given user, a calendar or schedule associated with the user, a current user or device state, a historical record of past user or device states, a current geolocation, a historical record of past geolocations, etc.

In some embodiments, a dynamic determination of emergency guideline and preventative information topics can be performed based at least in part on a location-based customization trigger. In some embodiments, location-based customization triggers can be provided by one or more geofences, which can themselves be fixed (e.g., defined with respect to a static location or coordinate) or dynamic (e.g., defined with respect to a moving location, object, entity, coordinate, etc.). The size, shape, and/or extent of such geofences can additionally be fixed or dynamic. As mentioned previously, a user location can be obtained from a geolocation process performed at or by the mobile application running on the user's mobile phone or computing device, although other location determination techniques may also be utilized without departing from the scope of the present disclosure. The granularity of the user location can, in some embodiments, be based on the desired granularity of the location-based customization trigger and/or associated geofence(s), e.g., a customization trigger that is based on the state or country that the user is currently located in can operate based on more granular location information than a customization trigger that is based on a geofence 200 ft in diameter and centered over the user's home or place of employment.

In an illustrative example, a location-based customization trigger can be associated with a determination that a user is within some pre-determined proximity to an ongoing event (or future event that has a predicted potential to impact that user's location). For example, consider the scenario in which a wildfire emerges on the West Coast of the United States—in such a scenario, the relevance of presenting the 'Fire' emergency guideline and preventative information topic 153 (e.g., as seen in FIG. 1B) may depend strongly on a calculated distance between the user and the fire.

For users within a close proximity to the fire (e.g., a 50-mile radius), one or more fire-related emergency guideline/preventative information topics (e.g., such as topic 153) can be automatically pushed to the top of the listing seen in user interface 100b of FIG. 1B. In some embodiments, the proximity levels and calculations can be based purely upon distance, e.g., where each proximity level is associated with one or more distance thresholds that are analyzed against the user's geolocation. In some embodiments, proximity levels and calculations can incorporate additional sources of information to better reflect a measure of risk or relevance to a specific user, in a specific location, at a specific time. For example, rather than defining close proximity to the fire as a 50-mile radius from the center of the fire (or as the area extending 50-miles from the boundary of the fire), additional factors such as prevailing winds, underlying topography, geography, and terrain, etc., can also be considered during the calculation to provide a more accurate dynamic determination of risk or relevancy. In this risk-adjusted or relevance-adjusted calculation, it could be determined that although a user is only 25 miles away from the fire (and therefore would fall within the 50-mile radius of the close proximity level), a half-mile wide river separates the user from the fire—therefore, the priority of providing the 'Fire' emergency guideline and preventative information 153 may be lower than it would otherwise have been if determined based on distance alone.

These dynamic emergency guideline topics can be integrated with the rest of the listing, shown in a separate section (e.g., an 'Ongoing Emergencies' section temporarily shown above the default 'Guidelines For Emergencies' section of topics 150), or some combination of the two (e.g., integrated with the rest of the listing, but with a red background box to call attention to the dynamic emergency guideline topics). In some embodiments, the system can generate and transmit alerts (e.g., push notifications) to users outside of the mobile application. For example, the system can send emails, texts, automated phone calls, video calls, pre-recorded video and audio messages over the internet, etc. In some embodiments, the system can display a temporary home screen user interface (not illustrated) notifying the user of the ongoing emergency or potential future emergency and containing links or UI elements allowing a user to view emergency guideline topics relevant to the emergency event. After viewing one or more of the emergency guideline topics, or acknowledging and closing the temporary home screen, the user can then be taken to the 'default' home screen shown in the example user interface 100b of FIG. 1B.

For users within an intermediate radius or distance from the fire (e.g., 50-500 miles away), the fire-related emergency guidelines and preventative information topic 153 can also be displayed on a temporary basis, in a manner similar or identical to that discussed above. In some embodiments, the dynamic determination for users within the intermediate distance range can result in the presentation of a topic mix that is different than the topic mix presented to the close distance range users that were discussed above. For example, close-range users might be pushed temporary topics that skew more towards emergency guidelines (e.g., 'Approaching Wildfire'), whereas intermediate-range users might be pushed temporary topics that tend more towards preventative and educational information (e.g., 'Understanding Wildfires,' 'Wildfire Impact on Air Quality Index (AQI)', etc.). These dynamic determinations can be made automatically by the presently disclosed emergency guideline system, by an employer of the user, by some combination of the two, and/or in view of user preferences towards receiving more emergency guidelines, more preventative information, or neither.

For users determined to be out of range of the fire (e.g., >500 miles away), no action is taken in terms of pushing temporary emergency guideline topics or preventative information topics, as these users are sufficiently distant from the fire that they are not expected to experience either primary or secondary impacts from the event. In some embodiments, a small notification could be displayed to even these out-of-range users allowing them to choose to learn more about the emergency event and/or to view related emergency guidelines and preventative information topics (e.g., a button, floating notification, UI element, etc., could be temporarily shown with a display to the effect of 'Western US Wildfires: Click Here to Learn More About Wildfire Emergencies').

In addition to the listings of emergency guideline and preventative information topics as discussed above, a home or default page of the user interface of the presently disclosed system can additionally (or optionally) display non-emergency information. An example of this is illustrated in FIG. 2A as the 'Non-Emergency Information' section 260 containing a selectable UI element 262 for 'Other ACME Corp Resources'. In general, this non-emergency information section 260 and/or the selectable non-emergency interface element 262 can include corporate resources, policies, handbooks, etc., that are provided by or correspond to the user's employer (or any other corporation, entity, or individual with which the user has some form of relationship, whether supervisory or otherwise). It is contemplated that the non-emergency information content and topics can be provided entirely by the presently disclosed preventative information and guideline system, can be provided by an employer/corporate/supervisory account registered with the presently disclosed system as being in charge of one or more registered users, can be provided by the presently disclosed system but edited or customized by an employer/corporate/ supervisory account, etc., and/or provided by some combination of the above, all without departing from the scope of the present disclosure.

As seen in the example user interface 200a of FIG. 2A, the 'Non-Emergency Information' section can present one or more different selectable non-emergency information topics, shown here as a single non-emergency interface element 262 for other corporate resources, which can function in a same or similar manner as the emergency guideline and preventative information topics 150 discussed above. For example, each non-emergency information topic 262 can be selectable to take the user to a more specific information page, to redirect the user to a relevant website or portal (e.g., via an internet connection of the user device running the mobile application), and/or to take the user to a secondary selection screen presenting sub-topics of the selected topic. In some embodiments, the example user interface 200a can be a continuation of the example user interface 100b, e.g., the example user interface 100b can be vertically scrollable such that after scrolling downward on user interface 100b a user is subsequently presented with user interface 200b. As illustrated, the example user interface 200a can be arranged for presentation below the example user interface 100b; in other words, the non-emergency information section 160 can be presented below the emergency guideline and preventative information topics 150, within the same overall user interface or interactive portion of the presently disclosed mobile application (e.g., as illustrated in FIG. 2A, additional emergency guideline and preventative information topics 257, 258, and 259 are shown—in some embodiments, the topics 257-259 can belong to the same emergency guidelines section 150 as the topics 151-156 of FIG. 1B). Furthermore, when the example user interfaces 100b and 200a are part of the same overall user interface, the video communication interface element 130b can be the same as the video communication interface element seen in FIG. 2A; likewise, the corporate security voice communication interface element 138 can be the same as the corporate security voice communication interface element 238 seen in FIG. 2A. In some embodiments, the corporate security voice communication interface elements 138,238 can be provided by or otherwise associated with the same underlying resources, services, and/or entities as the non-emergency interface element 262.

For example, FIG. 2B depicts an example user interface 200b that can be displayed in response to a user selecting the non-emergency interface element 262 of FIG. 2A. As illustrated, the example user interface 200b can include a non-emergency information and resources section 270, labeled here as 'ACME Corporate Resources' for purposes of example. The non-emergency information section 270 can include one or more sub-topics or resources (e.g., 272, 274, 276, 276, and 279) that are non-emergency in nature. In some embodiments, the non-emergency information section 270 can be configured as a corporate resources section and/or one or more of the non-emergency sub-topics or resources 272-279 can be configured as corporate sub-topics or corporate resources.

As illustrated in the example non-emergency information user interface 200b, the non-emergency sub-topics and resources can include, but are not limited to, a 'Contact HR' interface element 272, a 'Contact Employee Assistance Line' interface element 274, an 'Employee Handbook' interface element 276, and a 'Travel Assistance' interface element 278. Additionally shown in FIG. 2B is a separate section provided below the specific corporate resources section 270, e.g., a section containing an interface element 279 for a 'COVID-19 Information' topic. Topics such as COVID-19 Information might fall within what is considered a global non-emergency information topic that can displayed to all users automatically, regardless of any corporate or employer affiliations that might otherwise be characterized in the dynamic determination of the emergency and non-emergency information presented to the user via the mobile application described herein. In some embodiments, global non-emergency information topics can be generated by the presently disclosed system to be configurable to allow corporate/employer/supervisory accounts to opt-in (or opt-out) of having that global non-emergency information topic displayed to their users via the mobile application.

More generally, it is contemplated that corporate resource non-emergency information topics (e.g., contained within non-emergency section 270 and/or the example non-emergency information interface element 262) can be used to provide a single, centralized conduit to some or all internal company resources. The inclusion of internal company resources within the interface of the presently disclosed emergency guideline and preventative information system can incentivize greater user adoption or engagement with the emergency guideline and preventative information topics and materials, thereby helping to achieve the goal of greater employee education and improved preparedness for various emergency situations that may arise.

Just as the emergency guideline and preventative information topics discussed above were contemplated as being able to be served dynamically to only specific users (whether based on user preferences, employer preferences, a permission level, a calculated risk/relevance/need, etc.), so too can the non-emergency information topics and the internal company resource topics discussed with respect to FIGS. 2A and 2B be served to only specified users or users with appropriate permissions. For example, an employer might register user accounts for its employees, and configure the presently disclosed system to associate a 'view payroll information' permission with certain HR or accounting employees—allowing these employees to view payroll information within the mobile application or via a link/selectable element presented by the mobile application.

In some embodiments, the emergency guideline and preventative information system disclosed herein can be utilized to provide dynamically determined information that is most relevant to a user who is traveling. The dynamic determination of most relevant travel information can be performed automatically and independently by the system and/or can be performed in combination with one or more policies, configurations, or specific inputs provided to the system by the user's employer. In some examples, dynamically determined relevant travel information can be accessed in response to user selection of the 'Travel Assistance' topic/resource 278 presented within the non-emergency information/corporate resources section 270 of FIG. 2B.

Relevant travel information can be of any form or type of information described herein. For example, relevant travel information can include emergency information topics when it is determined that the user's current location and/or scheduled travel destination is currently experiencing an emergency event or is predicted to experience an emergency event. In an illustrative example, an emergency event included in relevant travel information could be the same as or similar to one or more of the emergency guideline topics 150, e.g., if a user's travel destination is currently experiencing a wildfire, then 'Fire' emergency guideline topic 153 could be displayed based on a dynamic determination; if the user's travel destination is prone to earthquakes, then 'Natural Disasters' emergency guideline topic 155 (and/or the specific 'Earthquake' emergency guideline sub-topic 462 of FIG. 4A) could be displayed based on a dynamic determination; and/or if the user's travel destination is more prone to theft, terror threats, or violence, then the 'Theft, Robbery or Burglary' sub-topic 257, 'Terror Threats' sub-topic 258, or 'Violence' sub-topic 259 could be displayed, respectively, based on a dynamic determination.

Relevant travel information can also extend beyond the scope of the example emergency guidelines specifically discussed herein. For example, relevant travel information could be dynamically determined as general information about the destination, an indication of areas recommended to avoid (or a safety score/ranking on a per-area basis for the destination), notifications of areas or events of current interest or heightened awareness, etc. In some embodiments, the relevant travel information can comprise a repository of information about the determined, inferred, or user input travel destination, where such information can include both static information and dynamic or live information. The travel destination of a user could be determined in real-time, e.g., by using one or more of the geolocation approaches and techniques described herein. The travel destination can also be based on user input indicative of the destination, wherein the user input is received either voluntarily or in response to an automatically generated prompt. In some embodiments, the travel destination can be obtained or inferred by providing the mobile application and/or presently disclosed system with access to the user's email account and/or calendar, e.g., in a corporate context the system could be integrated with the user's corporate accounts—based on this access, travel indicators (such as flight confirmations, hotel and car rental confirmations, addresses from receipts, etc.) could be extracted and used to determine a predicted travel destination for the user such that the corresponding relevant travel information can be dynamically determined, assembled, and in some embodiments, transmitted to the user's device in advance for local storage or caching to enable offline access to the relevant travel information once the user arrives at the travel destination.

In some examples, a corporate policy can be applied for travel and/or on a location-by-location basis across the various locations where the corporation operates or expects its employees (e.g., the users of the presently disclosed mobile application and/or system) to be physically present. The policy can implement different classes of users, with different associated permissions and types of relevant travel information that is to be dynamically provided. For example, if a corporation has a non-US office, a policy can be created to automatically provide US-based employees with relevant safety information and recommendations in response to determining that the US-based employee is present at the non-US office.

In some embodiments, one or more geofences can be utilized to implement a location-based or traveler policy for the dynamic determination of emergency guidelines, preventative information, and/or corporate information that is to be presented to users. For example, geofencing can be used to determine when (or if) a given user is within some proximity of a given office or other location for which different policies are desired (e.g., with the size, radius or extent of the geofence being adjustable corresponding to the desired proximity from the office or location about which the geofence is constructed). In some examples, geofences can be used to push certain emergency guidelines or other informational topics to user devices, e.g., in response to the user entering and/or leaving the geofence. In some embodiments, a geofence can be established around a corporate office—when a user enters the geofence, the mobile application on the user's device can automatically display emergency guidelines, preventative information and/or corporate information that pertains to the particular corporate office. This automatic display can be integrated with the existing display of emergency guidelines and other information as has been described herein and/or can be presented in a separate section that is generated specifically for this geofence-driven information. Continuing the same example, when a user exits the geofence, the mobile application on the user's device can automatically display a second set of emergency guidelines, preventative information and/or corporate information. For instance, the user could be provided with general safety information or warnings for the area(s) surrounding the corporate office or along the user's commute home. The user could also be provided with corporate security information reminding the user to ensure that they have not removed any sensitive or confidential corporate-owned materials from the office, and to immediately return and deposit any such materials that the user may have in his or her possession. In some embodiments, it is contemplated that one or more geofences (and the associated actions taken in conjunction with the geofences) can be configurable in advance by the presently disclosed system, can be configurable based on one or more inputs or preferences provided by a user and/or a corporation/employer of one or more users, or some combination of the two. Furthermore, in some examples the aforementioned corporations, employers, etc., of users of the presently disclosed mobile application and emergency guideline information system can themselves provide some or all of the content and information that are to be displayed in response to one or more geofence conditions being met, e.g., geometric or dimensional properties of a geofence can be specified and adjusted via the presently disclosed system, as can one or more policies, rules, or actions to be taken in response to various geofence triggers and events (which can themselves be specified via the system). Content such as emergency guidelines, preventative information, and/or corporate information, etc., that is to be displayed in response to certain conditions of the aforementioned policies, rules, actions, etc., can additionally be specified via the system using a same or similar mechanism as was utilized to define the geofence(s) and/or the corresponding policies, rules and actions.

As was discussed previously, the user interfaces 100a-200b of FIGS. 1A-2B can also include one or more dedicated emergency response and/or communication interface elements, which allow users to request, connect with, or otherwise utilize one or more emergency response resources from the mobile application. These emergency response resources can be public, e.g., the 'Dial 911' UI elements 142, 242a, 242b (which in some embodiments can all be the same or can be associated with the same underlying infrastructure and services). The emergency response resources can additionally (or alternatively) be private or internal, e.g., the 'ACME CORP SECURITY Call' UI elements 138, 238a, 238b (which in some embodiments can all be the same or can be associated with the same underlying infrastructure and services). In some embodiments, the emergency response resources can be provided in association with the presently disclosed mobile application and/or emergency guideline and preventative information system, e.g., the 'Security Agent' UI elements 130a and 132, the 'Bond Agent' UI element 130b (which in some embodiments can be the same or can be associated with the same underlying infrastructure and services). In some embodiments, the emergency response resources can be a combination of public, private or interval, and associated with the presently disclosed emergency guideline and preventative information system, with one or more of the various emergency response UI elements discussed herein being shared or persistent between the different example user interfaces.

In some cases, one or more of the connections (e.g., text-based, voice-based, video-based) that are provided by or in association with particular ones of the emergency response resources and UI elements can be provided by the mobile application itself, e.g., by including a dialer module(s) and/or communication module(s) to connect a requesting user to the appropriate emergency services without ever leaving the mobile application. Such a dialer module and/or communication module could use an existing cellular communication network, public or private, and/or could provide communicative links over the internet or other data/packet networks such as a company intranet. The connection might also be handled by causing the mobile application to launch another application on the user's phone, such as a pre-installed dialer application, video chat application, VoIP application, etc. In some embodiments, the choice of how to handle and route communications and user requests can be dictated by one or more security policies configured at the corporate/employer/supervisory account level, at the user account level, and/or at the system level of the present disclosed emergency guideline and preventative information system.

In addition to communicating with and requesting external emergency response resources, the user can also trigger a local/immediate emergency action, such as by selecting the 'SIREN' UI element 144,244 seen in FIGS. 1A-2B (and in some embodiments, the UI element 144,244 can be the same or otherwise persistent across some or all of the example user interfaces described herein). The selection of this element might cause the user's smartphone (or other computing device running the mobile application) to immediately play a siren tone at a certain pattern and/or volume, in order to alert anyone in the immediate vicinity to the user's duress. In some embodiments, the selection of the siren (or a similar 'panic' element or option) might also automatically transmit an alarm notification to an emergency response resource such as the company's internal security team (e.g., associated with the corporate security call UI element 138, 238a,238b). This alarm notification could be generated to be compatible with existing alarm and notification systems used by the security team or could be generated for transmission entirely within the mobile application. For example, the mobile application running on the user's phone cam simultaneously play the siren tone and transmit a notification to a backend server of the system, which forwards or pushes the notification to mobile applications of the security team. In such examples, the notification can include available information such as the user's location, additional information about the threat, the page of the mobile application the user was viewing when he or she pressed the 'siren' button, etc. It is also possible that a user selection of the siren or other panic UI element might also automatically open a communication session with the emergency response resource (e.g., company internal security team in this example), trigger a silent communication that allows the security team to listen in on the user's situation, or cause the user's phone to begin streaming one or more types of sensor data back to the security team in order to better permit the security team to analyze, identify, and determine a plan of response to any threats, if present (see, e.g., commonly owned U.S. Pat. No. 10,600,295 for further details).

As mentioned previously, after selecting a specific emergency guideline or preventative information topic, the user interface of the mobile application can then display the requested information via one or more different modalities. For example, as seen in the example user interface 300a of FIG. 3A, the information can be displayed in a text-based format. As seen in example user interface 300b of FIG. 3B, the information can also be provided in an audio-based format, where both the text option and the audio option are selectable from given interface elements. In some embodiments, the information can additionally or alternatively be provided in a video-based format (not shown), which can be selectable from a same or similar interface as one or more of the text option or the audio option. In some examples, a video option can replace either the audio option interface element and/or the text option interface element depicted in FIGS. 3A and 3B, described below The example user interfaces 300a and 300b can be provided in combination, e.g., such that they are both part of the same overall UI portion of the mobile application. In the particular example of FIGS. 3A and 3B, the two example user interfaces both correspond to a specific emergency guideline 351 for 'Elevator Entrapment.' In some embodiments, the elevator entrapment emergency guidelines (and one of the corresponding user interfaces 300a,300b) can be presented in response to a user selection of the 'Elevator Entrapment' interface element 151 seen in FIG. 1B, although it is possible for other navigational inputs to trigger the display of the elevator entrapment emergency guidelines as well. For example, a search function or search element (shown at 105 in FIG. 1B) can be used to receive a user search query—if a user search query is received that is determined to be related to elevator emergencies, then the elevator entrapment emergency guidelines of example user interfaces 300a,300b can automatically be presented in response to the user search query, without the user ever selecting the corresponding elevator entrapment interface element 151.

Figures 3A, 3B:
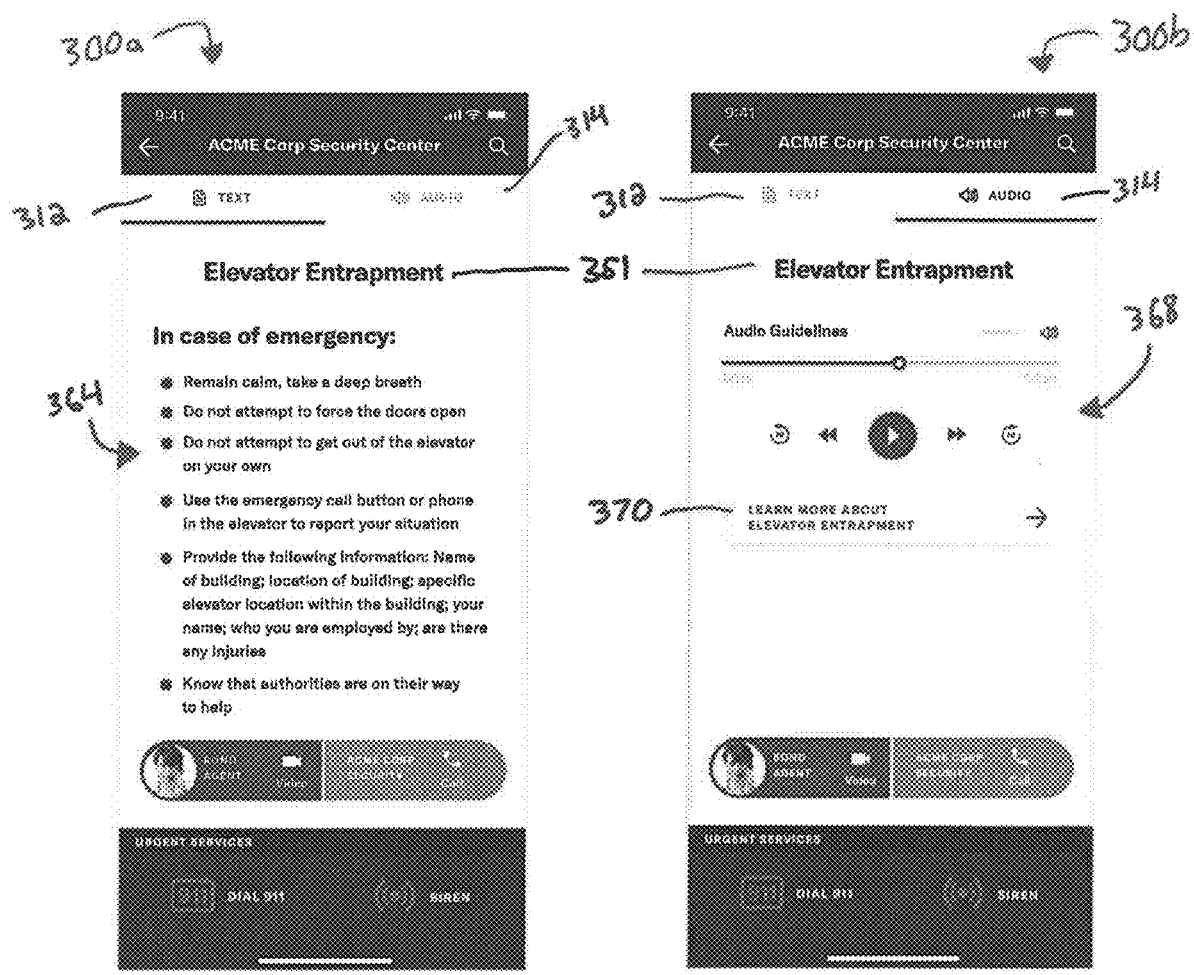
FIG. 3A depicts an example user interface for presenting text-based emergency guidelines and preventative information topics.
FIG. 3B depicts an example user interface for presenting audio-based emergency guidelines and preventative information topics.

To select between the text-based emergency guidelines of user interface 300a/FIG. 3A and the audio-based emergency guidelines of user interface 300b/FIG. 3B, both of the user interfaces 300a,300b are shown as including two dedicated user interface elements: a text option selection element 312 and an audio option selection element 314. Selection of the text option 312 causes the elevator entrapment emergency guidelines 351 to be presented as a textual content 364, while selection of the audio option 314 causes the elevator entrapment emergency guidelines 351 to be presented as an audio content 368. In some embodiments, the textual content 364 and the audio content 368 can contain or present identical information, although it is also possible that the audio content 368 presents an abridged or abbreviated version of textual content 364 (e.g., for purposes of data storage or transmission constraints, audio playback speed vs. reading speed, etc.).

The audio content (or video, etc.) 368 of the emergency guideline or preventative information topic 351 can be identical to the textual content 364 and/or can be different from the textual content 364. For example, the audio (or video) content 368 might be more succinct in order to minimize file sizes and storage or data transmission requirements on the system. In some embodiments, the audio (or video) content 368 can be provided by a media player element of the mobile application to allow a user to control playback of the content. For example, the user interface 300b of FIG. 3B shows on-screen UI elements for controlling audio playback of audio content 368. In some embodiments, voice commands or voice control could additionally or alternatively be used. Other control schemes, including but not limited to gesture control, can also be used without departing from the scope of the present disclosure. In some embodiments, the system can automatically generate one or more tags or 'bookmark' elements indicating specific portions of the audio (or video) content 368 where certain information is located, thereby allowing a user to more easily jump to desired portions of the content and navigate it in a non-linear fashion. For example, an automatic tag could be generated and displayed for each of the bullet point items in the textual content 364 of FIG. 3A. Automatic tags could also be generated with a broader scope, e.g., 'summary', 'recommended actions', 'emergency contact resources', 'more details', etc. In some embodiments, the automatic tag generation could be performed by one or more trained machine learning networks, receiving as input either the raw audio/video content 368 only, or receiving as input the raw audio/video content 368 and the accompanying textual content 364 (and/or some other version).

In some embodiments, the audio content 368 of the emergency guideline and preventative content topics 150 can be pre-recorded and then updated as necessary. In some embodiments, a corporate/employer/supervisory account can be responsible for providing its own recordings, can optionally upload or provide its own audio files to supplement ones already available within the system, or some combination of the above. In some embodiments, the audio content 368 can be automatically generated by the system, either onboard the user device or at a central computing location/server, e.g., using one or more voice-to-text algorithms or modules. Moreover, such automated embodiments can go beyond a word-for-word conversion of the textual version 364 of the emergency guideline topic into an audio-based version of the same—for example, the automated audio generation can take as input the textual content 364 and then automatically generate a more concise audio content version 368, as was mentioned above.

In some embodiments, a given emergency guideline topic, such as the elevator entrapment topic 351, can be presented in combination with an additional information option 370, shown in FIG. 3B as 'LEARN MORE ABOUT ELEVATOR ENTRAPMENT." Although depicted only in FIG. 3B, it is appreciated that the additional information option 370 can additionally (or alternatively) be presented in the example user interface 300a of FIG. 3A, e.g., below the textual content 364. The additional information option 370 can continue presenting information pertaining to the same overall topic, but with a greater level of detail. This additional information can be provided within the mobile application (e.g., retrieved from a remote location, as such information is unlikely to be viewed or requested in an actual emergency situation, although it is noted local storage remains an option) or provided from an external service that the mobile application links to (e.g., via a URL). In some embodiments, in addition to presenting more detailed information, the interface element for the additional information option 370 can also provide a user input dialog, in which a user can enter specific questions he or she may have about the overall emergency guideline or preventative information (e.g., requesting clarification about a piece of guidance or certain step they are confused about; asking for advice on a hypothetical scenario they have come up with, etc.) and/or in which the user can provide feedback on the information presented by the mobile application. In some embodiments, user questions can be processed immediately or in substantially real-time, e.g., by an agent of the user's employer and/or an agent associated with the presently disclosed emergency guideline and preventative information system.

Figure 3C:
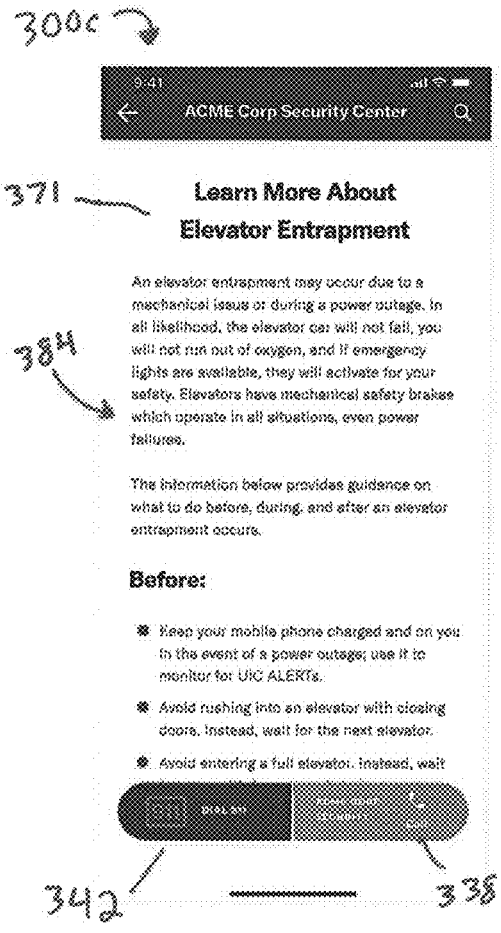
FIG. 3C depicts an example user interface for presenting detailed emergency information related to a specific emergency guideline.

FIG. 3C depicts an example user interface 300c that presents a specific emergency guideline additional information section 371—here, the additional information section 371 'Learn More About Elevator Entrapment' corresponds to the specific emergency guideline 351 'Elevator Entrapment' and can be accessed in response to user selection of the additional information option 370. As illustrated, the additional information section 371 presents an additional textual content 384, although it is appreciated that the additional information could be presented as an audio content similar as described above with respect to textual content 364 and audio content 368, without departing from the scope of the present disclosure.

Figure 3D:
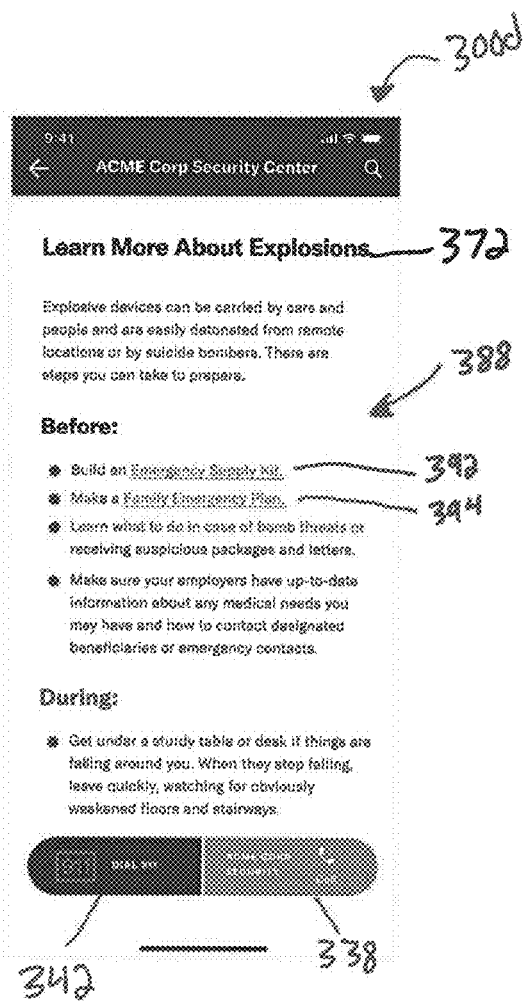
FIG. 3D depicts another example user interface for presenting detailed emergency information related to a specific emergency guideline.

FIG. 3D depicts another example user interface 300d presenting an additional information section 372 for a different emergency guideline. In particular, the additional information section 372 is a 'Learn More About Explosions' section, and for example can correspond to the specific emergency guideline accessed from the 'Explosions' UI element 152 of the emergency guidelines section 150 of FIG. 1B. Additionally, similar to as was described above, the additional information section 372 can be accessed in response to user selection of an additional information option that is presented on a specific emergency guidelines page or interface for the 'Explosions' UI element 152 (not shown).

Unlike the additional elevator entrapment information section 371 of FIG. 3C, the additional explosions information section 372 of FIG. 3D contains an additional textual content 388 that includes linked objects 392 and 394. As illustrated, linked object 392 corresponds to an 'Emergency Supply Kit' resource and linked object 394 corresponds to a 'Family Emergency Plan' resource. The resources associated with the linked objects 392,394 can be internal or external to the presently disclosed mobile application and emergency guideline and preventative information system. For example, an internal resource corresponding to linked object 392 can be provided by an additional reference page of the mobile application with guidelines or preventative information relating to assembling or preparing an emergency survival kit. An external resource corresponding to linked object 392 could be the same reference page but hosted externally by a third party. In some embodiments, the resource corresponding to linked object 392 (whether internal or external) can be a physical or tangible item rather than information, e.g., user selection of linked object 392 causes the user to be presented with an option to buy or obtain an emergency supply kit. In some examples, the linked object can be associated with user profile information or user-specific information stored by the presently disclosed system. For example, selection of the family emergency plan linked object 394 can cause the system to present the user with one or more data entry forms or prompts that cause the system to collect and store a specific family emergency plan for that individual—the collected data can then be used to generate a family emergency plan that is stored in one or more databases of the presently disclosed system such that the stored data/family emergency plan object is associated with the given user's account or profile.

Figures 4A, 4B:
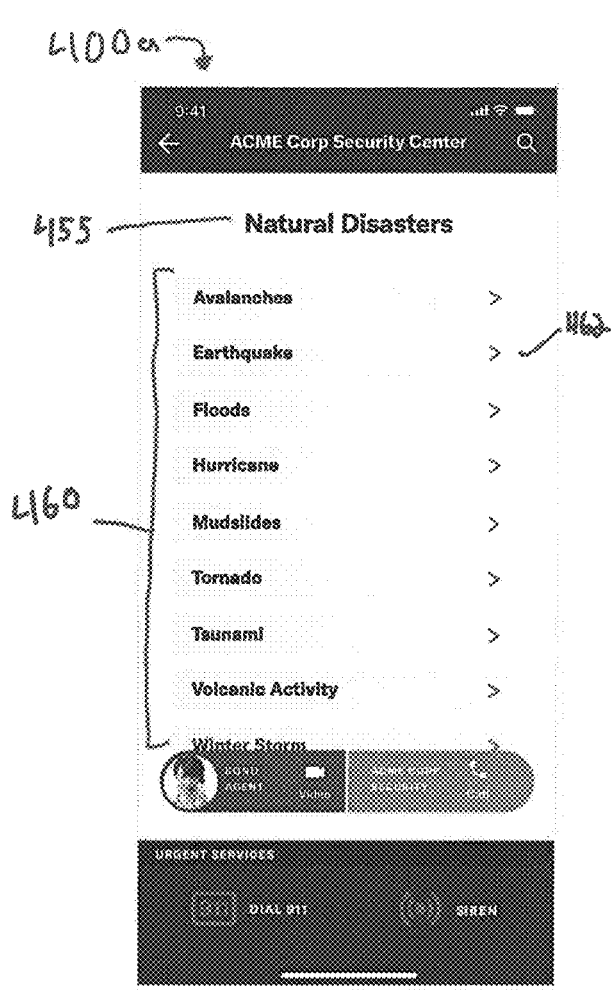
FIG. 4A depicts an example user interface for presenting nested emergency guidelines.
FIG. 4B depicts an example user interface for presenting a single one of the nested emergency guidelines of FIG. 4A.

FIGS. 4A and 4B depict example user interfaces 400a and 400b, respectively, corresponding to an expandable or nested guideline/information topic 455 that has a plurality of individual sub-topics 460. In the particular example of FIGS. 4A and 4B, the expandable/nested topic 455 is an emergency guideline topic for 'Natural Disasters,' although it is appreciated that the structure and functionality described below can be applied to emergency guideline topics, preventative information topics, non-emergency information topics, etc., without departing from the scope of the present disclosure. In some examples, the user interface 400a for the expandable emergency guideline topic 'Natural Disasters' 455 can be presented in response to user selection of the corresponding 'Natural Disasters' emergency guideline interface element 155 that is seen in the top-level emergency guideline section 150 of FIG. 1B.

After selection of the top-level UI element 155, user interface 400a can be presented with a listing of the various sub-topics 460 that are nested underneath the top-level UI element 155 (shown as 455 in FIG. 4A). Each one of the plurality of sub-topics 460 can each comprise an interactive and selectable user interface element similar or identical to the user interface elements 151-156 discussed previously. In some embodiments, the sub-topics 460 can be sorted alphabetically, by date added, etc. In some embodiments, the sub-topics 460 can be sorted and dynamically presented based on a calculated or predicted relevance to the given user, as was also described previously with respect to dynamic presentation of the top-level emergency guideline topics, preventative information topics, and/or non-emergency information topics.

From example user interface 400a, a user can select a specific one of the plurality of sub-topics 460. For example, selection of the 'Earthquakes' sub-topic 462 can cause the example user interface 400b to be presented in response. The sub-topic heading 462 is reproduced in example user interface 400b as a selected sub-topic 472 'Earthquake,' and is associated with a corresponding textual content 484 (although other content forms, such as audio content, can also be utilized without departing from the scope of the present disclosure, e.g., selectable via a text view option 412 and an audio view option 414 within user interface 400b). In some embodiments, multiple nested or expandable levels can be used to sort and present various emergency guideline topics, preventative information topics, and/or non-emergency and corporate information topics, e.g., in an arrangement having more than the single nested level that is shown in FIG. 4A. Additionally, one or more topics (whether emergency, preventative, or non-emergency information topics) can be presented in multiple locations. For example, the fire emergency guideline 153 seen in the top-level emergency guidelines section 150 of FIG. 1B can also be presented underneath the natural disasters heading 455, e.g., such that the fire emergency guideline 153 is presented in standalone, top-level form (as shown in FIG. 1B) and is also presented in a nested, sub-topic form as part of the plurality of sub-topics 460 of FIG. 4A (not shown). In some cases, a topic that is presented as both a top-level topic and a nested sub-topic can be presented identically regardless of whether it was selected at the top level or from a nested sub-topic structure.

In some embodiments, the underlying data for a given emergency guideline or preventative information topic can be stored locally on the user computing device, e.g., included in the application itself during installation, or downloaded separately/at a later time. The underlying data can also be stored remotely and streamed to the user device on-demand. In some embodiments, an individual user and/or corporate/employer/supervisory user can configure one or more parameters governing the manner in which underlying data is stored or retrieved when a user requests the corresponding emergency guideline or preventative information topic. The local storage/streaming dynamic can also be governed in one or more respects at the system level of the presently disclosed emergency guideline and preventative information system. Similarly, the audio (or any other information presentation formats such as video) version of the emergency guideline/preventative information topic can also be stored locally or remotely from the user computing device.

Local storage can utilize an internal memory of the user computing device, or an external memory coupled to the user computing device (e.g., an external memory device could be provided in order to increase security of sensitive corporate or internal information; for example, an employer might provide its employees with a specially designed case that includes a local storage element, such that the case connects to the user's phone and couples the local storage element to the mobile application via hardware connector (USB, USB-C, Lightning, etc.) or wirelessly (e.g., Bluetooth, Wi-Fi, NFC, etc.). In some embodiments, a maximum amount or percentage of local storage usage can be specified. When the storage limit is hit or is approaching, information can be preserved based on a prioritization system—local storage is dedicated to saving emergency guidelines and preventative information of topics in a descending priority/severity order (e.g., active shooter and building fire would be high priority, printer jam would be low priority). Additional configurable options could include compressions settings, e.g., where a user can opt for more extensive compression (resulting in slightly longer load times before the content is uncompressed and can be displayed), or for more lossy compression (primarily in the case of audio/video versions of the content), or a combination of the two.

Remote storage can make use of one or more servers or cloud content distribution networks that serve underlying data for requested emergency guideline and preventative information topics in real-time, e.g., much in the same manner that webpage content is served in response to a user visiting a corresponding URL via a browser on their computing device. Caching can be employed to save local versions of content that is frequently accessed and/or deemed high importance. In some embodiments, text-based content that is served remotely can be stored internally or cached if a copy does not already exist in memory of the user device. In some embodiments, even if a local version is available, the mobile application might check to see if an internet connection is available, and if such a connection exists, then check to see if any updates are available for the content. If an update is available, it can be downloaded and displayed to the user (and replace the old version in storage). The prior version of the content can be displayed to the user immediately, i.e., as the update process runs silently in the background.

In some embodiments, an employer, corporation, or other supervising entity can install one or more local servers, computing devices, or content-distribution networks such that users store either no local content or only partially store local content, and then retrieve the remaining (non-locally stored) content from the local content-distribution network, i.e., which can be a wireless intranet, network of Bluetooth (or other wireless communication protocol) databases meshed to cover the corporate campus or other desired areas in which the users associated with the corporate/employer/supervisory account will often be located or otherwise requesting emergency guideline and preventative information topics.

Figure 5A:
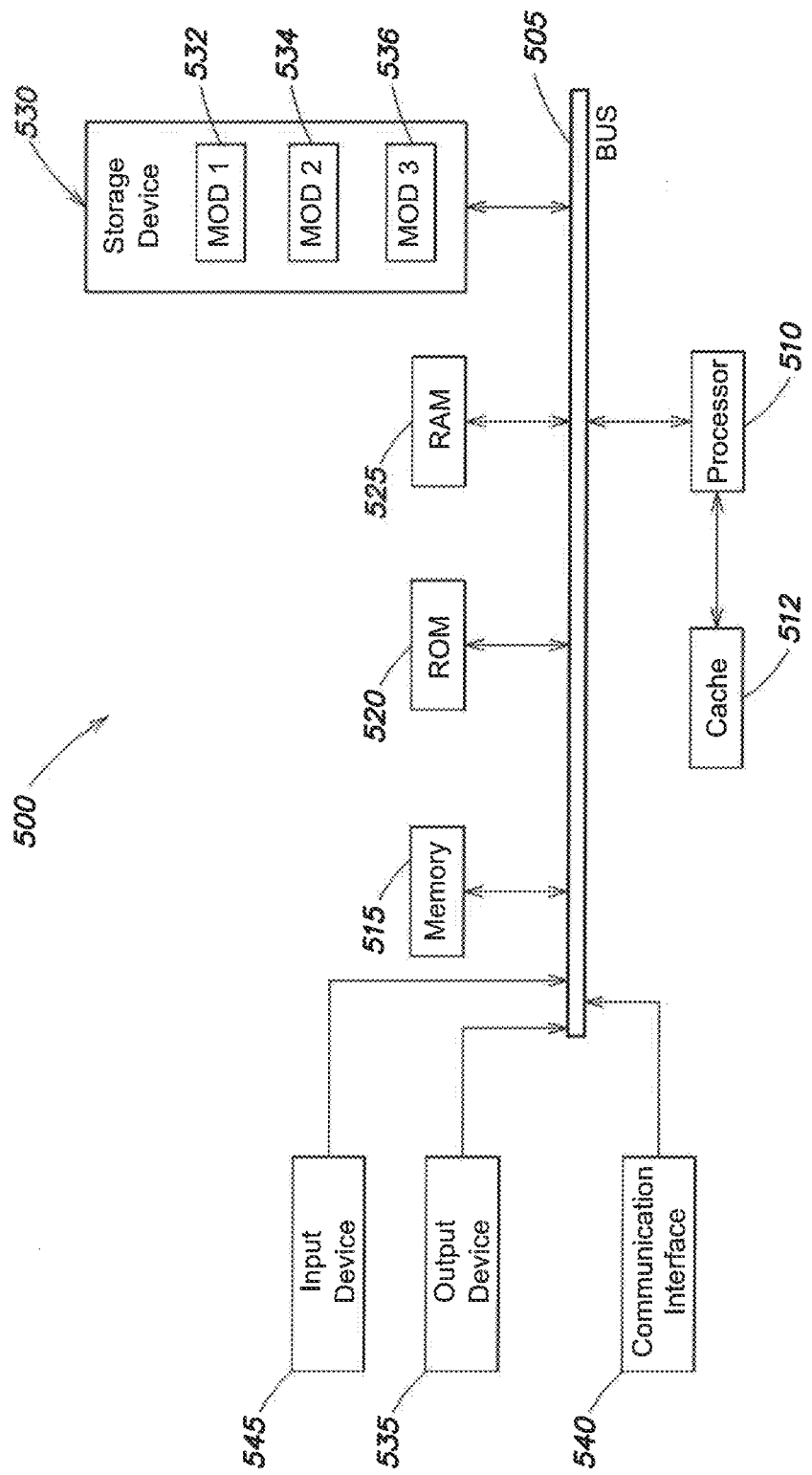
FIG. 5A depicts a system bus computing system architecture in which one or more aspects of the present disclosure may be provided.
Figure 5B:
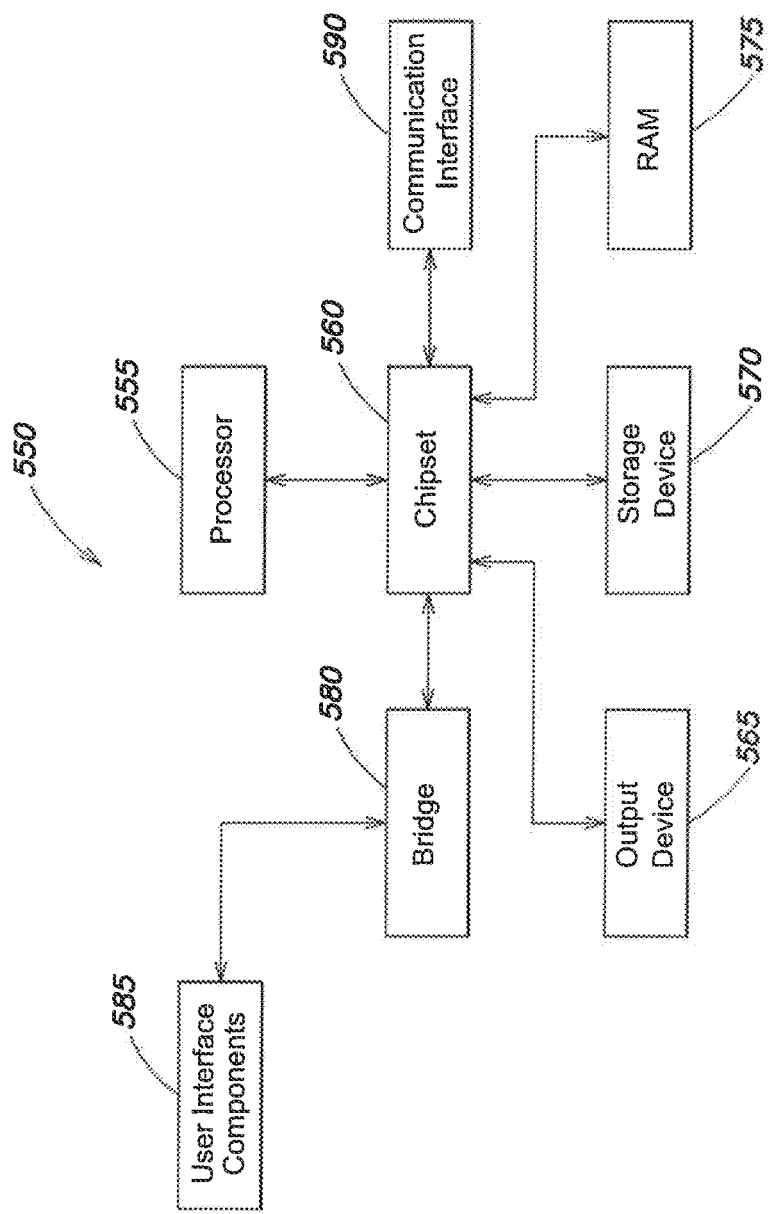
FIG. 5B depicts an example computer system chipset architecture in which one or more aspects of the present disclosure may be provided.

One or more aspects of the present disclosure can be implemented in the example system embodiments of FIGS. 5A and/or 5B. FIG. 5A illustrates a system bus computing system architecture 500 in which one or more aspects of the present disclosure can be provided. FIG. 5B illustrates an example computer system 550 having a chipset architecture that can be used in executing aspects of the present disclosure and in generating and displaying a graphical user interface (GUI) and/or a mobile application having one or more user interfaces or user interface elements. In particular, FIG. 5A and FIG. 5B illustrate example system embodiments in which one or more aspects of the present disclosure may be provided, deployed, or configured. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random-access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general-purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid-state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
   receiving, for a given user of a first set of users, a first preventative information policy, wherein the first preventative information policy comprises one or more selected preventative information topics and one or more user parameters associated with the first set of users;
   generating, based at least in part on the first preventative information policy, a user profile, wherein the user profile includes the one or more selected preventative information topics;
   calculating, for the given user, one or more dynamically determined emergency guideline topics by:
   analyzing a current user location against a database of emergency event entries, each emergency event entry including at least a classification of an ongoing emergency event and a location of the ongoing emergency event;
   based at least in part on the analysis, determining a set of proximity-adjusted emergency events for the current user location; and generating the one or more dynamically determined emergency guideline topics by applying one or more calculated relevance levels to the set of proximity-adjusted emergency events, the one or more calculated relevance levels based at least in part on the first preventative information policy; and generating a selectable user interface element for each of the one or more dynamically determined emergency guideline topics and the one or more selected preventative information topics, wherein the selectable user interface elements generated for the dynamically determined emergency guideline topics indicate the calculated relevance levels.

2. The method of claim 1, wherein generating the selectable user interface element for a given one of the dynamically determined emergency guideline topics further comprises linking the selectable user interface element to a textual content for the given one of the dynamically determined emergency guideline topics.

3. The method of claim 2, wherein generating the selectable user interface element for a given one of the selected preventative information topics further comprises linking the selectable user interface element to a textual content file location determined from the first preventative information policy.

4. The method of claim 1, wherein the one or more selected preventative information topics are selected from a plurality of pre-defined preventative information topics based at least in part on the one or more user parameters.

5. The method of claim 4, wherein the one or more user parameters include access permissions for the first set of users.

6. The method of claim 1, further comprising calculating an update to the dynamically determined emergency guideline topics in response to detecting a change in the current user location, wherein detecting the change in the current user location is based on analyzing the current user location against one or more stored user location entries.

7. The method of claim 1, wherein the one or more calculated relevance levels are determined based at least in part on a user classification obtained from the one or more user parameters of the first preventative information policy.

8. The method of claim 2, further comprising linking the selectable user interface element for the dynamically determined emergency guideline topic to an automatically generated audio content, wherein the automatically generated audio content is based on the textual content.

9. The method of claim 2, wherein the selectable user interface element for the dynamically determined emergency guideline topic is generated to include a selectable option between the textual content and an audio content, wherein the audio content is based on the textual content.

10. The method of claim 1, further comprising receiving a second preventative information policy for a second set of users, wherein:
the second preventative information policy includes one or more selected preventative information topics and one or more user parameters different from those of the first preventative information policy; and
one or more dynamically determined emergency guideline topics generated for the second set of users based on the second preventative information policy are different from the one or more dynamically determined emergency guideline topics generated for the given user of the first set of users.

11. A system comprising:
an emergency guideline and preventative information display application provided on a mobile computing device, the display application including at least a first interface for displaying dynamically determined emergency guideline topics and a second interface for displaying preventative information topics; and
at least one processor in communication with the emergency guideline and preventative information display application, wherein the processor is coupled with a non-transitory computer-readable storage medium having stored therein instructions which, when executed by the at least one processor, cause the at least one processor to:
receive, for a given user of a first set of users, a first preventative information policy, wherein the first preventative information policy comprises one or more selected preventative information topics and one or more user parameters associated with the first set of users;
generate, based at least in part on the first preventative information policy, a user profile, wherein the user profile includes the one or more selected preventative information topics;
calculate, for the given user, one or more dynamically determined emergency guideline topics by:
analyzing a current user location against a database of emergency event entries, each emergency event entry including at least a classification of an ongoing emergency event and a location of the ongoing emergency event;
based at least in part on the analysis, determining a set of proximity-adjusted emergency events for the current user location; and
generating the one or more dynamically determined emergency guideline topics by applying one or more calculated relevance levels to the set of proximity-adjusted emergency events, the one or more calculated relevance levels based at least in part on the first preventative information policy; and
generate a selectable user interface element for each of the one or more dynamically determined emergency guideline topics and the one or more selected preventative information topics, wherein the selectable user interface elements generated for the dynamically determined emergency guideline topics indicate the calculated relevance levels.

12. The system of claim 11, wherein the instructions cause the at least one processor to generate the selectable user interface element for a given one of the dynamically determined emergency guideline topics by:
linking the selectable user interface element to a textual content for the given one of the dynamically determined emergency guideline topics.

13. The system of claim 12, wherein the instructions cause the at least one processor to generate the selectable user interface element for a given one of the selected preventative information topics by:
linking the selectable user interface element to a textual content file location determined from the first preventative information policy.

14. The system of claim 11, wherein the instructions cause the at least one processor to select the one or more selected preventative information topics from a plurality of pre-defined preventative information topics based at least in part on the one or more user parameters.

15. The system of claim 14, wherein the one or more user parameters include access permissions for the first set of users.

16. The system of claim 11, wherein the instructions cause the at least one processor to calculate an update to the dynamically determined emergency guideline topics in response to detecting a change in the current user location, wherein detecting the change in the current user location is based on analyzing the current user location against one or more stored user location entries.

17. The system of claim 11, wherein the instructions cause the at least one processor to determine the one or more calculated relevance levels based at least in part on a user classification obtained from the one or more user parameters of the first preventative information policy.

18. The system of claim 12, wherein the instructions cause the at least one processor to link the selectable user interface element for the dynamically determined emergency guideline topic to an automatically generated audio content, wherein the automatically generated audio content is based on the textual content.

19. The system of claim 12, wherein the instructions cause the at least one processor to generate the selectable user interface element for the dynamically determined emergency guideline topic to include a selectable option between the textual content and an audio content, wherein the audio content is based on the textual content.

20. The system of claim 11, wherein the instructions cause the at least one processor to receive a second preventative information policy for a second set of users, wherein:
- the second preventative information policy includes one or more selected preventative information topics and one or more user parameters different from those of the first preventative information policy; and
- one or more dynamically determined emergency guideline topics generated for the second set of users based on the second preventative information policy are different from the one or more dynamically determined emergency guideline topics generated for the given user of the first set of users.

* * * * *